(12) United States Patent
Holtom

(10) Patent No.: US 7,457,328 B2
(45) Date of Patent: Nov. 25, 2008

(54) POLARIZATION METHODS FOR DIODE LASER EXCITATION OF SOLID STATE LASERS

(75) Inventor: Gary R. Holtom, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 11/436,731

(22) Filed: May 17, 2006

(65) Prior Publication Data

US 2007/0268951 A1 Nov. 22, 2007

(51) Int. Cl.
*H01S 3/098* (2006.01)

(52) U.S. Cl. .............................. 372/18; 372/27; 372/69

(58) Field of Classification Search .................. 372/18, 372/69, 27, 106
See application file for complete search history.

(56) References Cited

U.S. PATENT DOCUMENTS

| | | | | |
|---|---|---|---|---|
| 6,229,645 | B1 * | 5/2001 | Hendrix ...................... | 359/483 |
| 6,385,216 | B1 * | 5/2002 | Chang et al. .................. | 372/6 |
| 2002/0176471 | A1 * | 11/2002 | Peressini ..................... | 372/70 |
| 2003/0008448 | A1 * | 1/2003 | Kafka et al. ................ | 438/200 |

OTHER PUBLICATIONS

Boulon, "$Yb^{3+}$-doped oxide crystals for diodeo-pumped solid state lasers: crystal growth, optical spectroscopy, new criteria of evaluation and combinatorial approach," *Optical Materials*, vol. 22, pp. 85-87, 2003.

Brabec et al., "Mode locking in solitary lasers," *Optics Letters*, 16(24):1961-1963, Dec. 15, 1991.
Brunner et al., "Diode-pumped femtosecond $Yb:KGd(WO_4)_2$ laser with 1.1-W average power," *Optics Letters*, 25(15):1119-1121, Aug. 1, 2000.
Chen et al., "Optimization of fiber-coupled laser-diode end-pumped lasers: Influence of pump-beam quality," *IEEE J. Quantum Electron.*, 32(11):2010-2016, Nov. 1996.
Chenais et al., "Thermal lensing in diode-pumped ytterbium lasers—Part II: Evaluation of quantum efficiencies and thermo-optic coefficients," *IEEE J. Quantum Electron.*, 40(9):1235-1243, Sep. 2004.
German, "Polarization beam splitters for pumping of F II-center lasers," *Optics Letters*, 4(2):68-69, Feb. 1979.
Innerhofer et al., "60-W average power in 810-fs pulses from a thin-disk Yb:YAG laser," *Optics Letters*, 28(5):367-369, Mar. 1, 2003.
Lagatsky et al., "$Yb^3+$-doped $YVO_4$ crystal for efficient Kerr-lens mode locking in solid-state lasers," *Optics Letters*, 30(23):3234-3236, Dec. 1, 2005.
Liu et al., "Diode-pumped Kerr-lens mode-locked $Yb:KY(WO_4)_2$ laser," *Optics Letters*, 26(21):1723-1725, Nov. 1, 2001.
Röser et al., "131 W 220 fs fiber laser system," *Optics Letters*, 30(20):2754-2756, Oct. 15, 2005.

* cited by examiner

*Primary Examiner*—Dung T Nguyen
(74) *Attorney, Agent, or Firm*—Klarquist Sparkman, LLP

(57) ABSTRACT

A mode-locked laser employs a coupled-polarization scheme for efficient longitudinal pumping by reshaped laser diode bars. One or more dielectric polarizers are configured to reflect a pumping wavelength having a first polarization and to reflect a lasing wavelength having a second polarization. A Yb-doped gain medium can be used that absorbs light having a first polarization and emits light having a second polarization. Using such pumping with laser cavity dispersion control, pulse durations of less than 100 fs can be achieved.

18 Claims, 7 Drawing Sheets

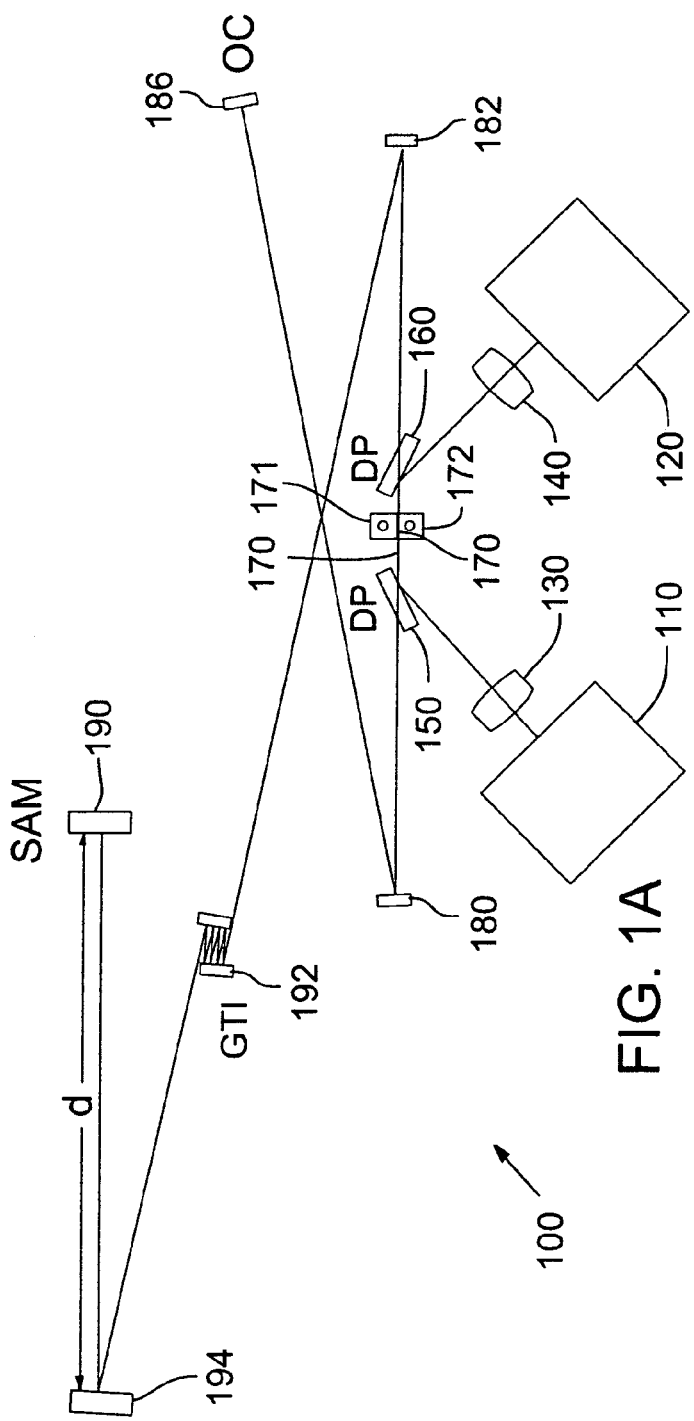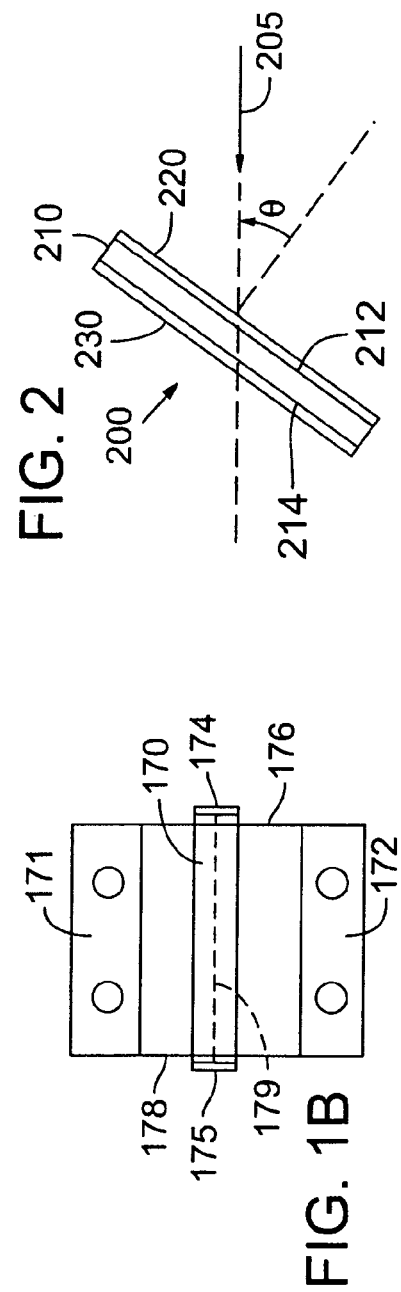

FIG. 8
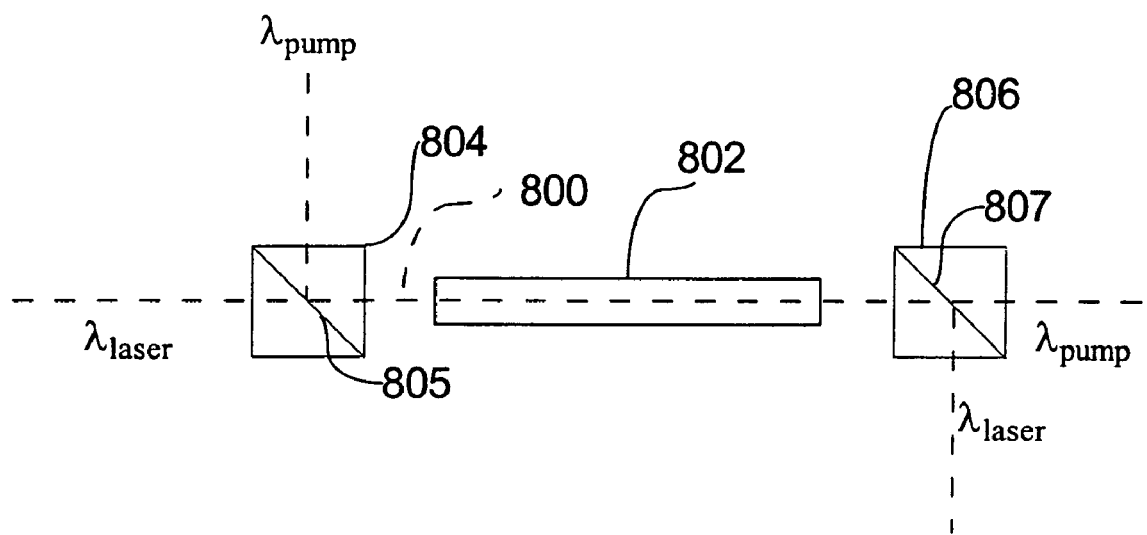
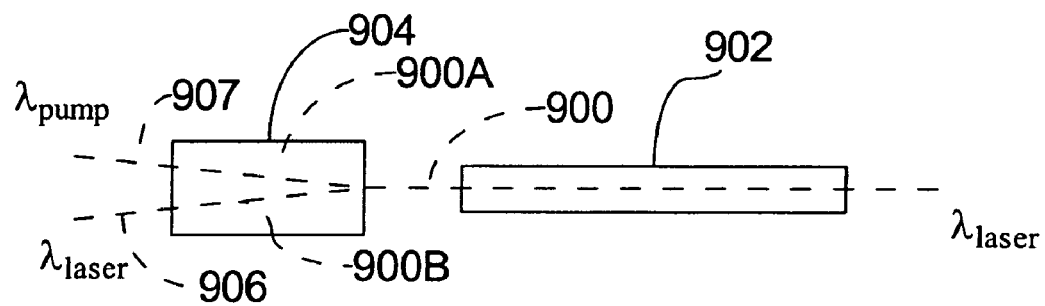
FIG. 9

POLARIZATION METHODS FOR DIODE LASER EXCITATION OF SOLID STATE LASERS

ACKNOWLEDGMENT OF GOVERNMENT SUPPORT

This invention was made with Government support under Contract DE-AC0576RLO1830 awarded by the U.S. Department of Energy. The Government has certain rights in the invention.

FIELD

The disclosure pertains to diode pumped lasers.

BACKGROUND

Mode-locked (ML) lasers have a variety of industrial and scientific applications due to their extremely short pulse durations. For example, ML lasers can typically produce pulses with durations down to a few tens of femtoseconds. However, current laser systems that can provide these short pulse widths (e.g., ML Ti:Sapphire lasers) are frequently expensive, large, and can require special installations and delicate alignment procedures.

One approach to reducing the size and cost of ML lasers is to use diode laser pumping. Laser diodes are relatively inexpensive, and the required drive circuitry can be simple and compact. Unfortunately, the pump power available from a single laser diode is limited. Increased pump power can be provided with laser diode bars. Such laser diode bars typically include 10-50 laser diodes separated by about 100-200 μm. Unfortunately, laser diode bars emit from a large area due to the large diode separation, and efficient coupling of the laser diode emission into a laser host is difficult. In addition, some laser systems have pump and lasing wavelengths that differ by less than 100 nm. These laser systems can have high efficiency due to the small quantum defect, but it is difficult to independently control pump radiation and laser emission because the pump and laser wavelengths are spectrally close. For at least these reasons, improved methods and apparatus are needed for delivering pump radiation to a gain medium.

SUMMARY

Mode-locked operation of a Yb:KGW laser described herein employs a coupled-polarization scheme for efficient longitudinal pumping by a pair of reshaped laser diode bars. The laser includes one or more dielectric polarizers configured to transmit a lasing wavelength with one polarization, and to reflect a pumping wavelength with a second polarization. The laser systems described herein have applications in multiphoton microscopy and spectrometry, and can also be used in amplifiers and optical parametric oscillators (OPO).

In an example described herein, pump radiation having a first (linear) state of polarization is directed to a gain medium along a pump axis, and laser radiation having a second (linear) state of polarization is directed along a laser axis. The laser axis can be an internal axis of a laser cavity or an axis along which laser radiation can be output. The pump axis can be "folded" to be along the laser axis once the pump radiation is received in the laser cavity. However, the pump axis is substantially free of laser radiation outside of a laser cavity, particularly in laser systems in which cavity losses at the laser wavelength are well controlled. In a particular example, pump radiation is incident to a surface of a dielectric polarizer in an S-polarization while laser radiation is incident as a P-polarization, and the dielectric polarizer is configured to reflect the S-polarization (pump radiation) and transmit the P-polarization (laser radiation).

In other examples, different states of polarization can be used such as, for example, circular or elliptical. Typically a polarizer is used to efficiently direct pump radiation to a gain medium without introducing appreciable losses to a laser cavity. Such losses are typically less than about 5%, 4%, 3%, 2%, 1%, or less. Pump and laser polarizations need not be completely orthogonal but should be such that at least about 90%, 95%, or 98% of the total power in each is in an orthogonal polarization state in order to achieve efficient pumping and/or low cavity loss.

Dielectric polarizers that include a substrate tilted with respect to both inputs (pump and laser) can be especially convenient, but polarizing beam splitter cubes or crystal polarizers can be used as well. For superior performance, gain media having strong absorption in one state of polarization and strong laser emission in an orthogonal state of polarization are preferred. Pump radiation is preferably concentrated in a wavelength range at which it is substantially absorbed by the gain medium.

In some examples, lasers comprise a gain medium having an associated laser wavelength and pump wavelength, and a source of pump radiation that emits radiation substantially at the pump wavelength. A polarizer is configured to couple laser radiation at the laser wavelength and having a first state of polarization from the gain medium along a first axis and the pump radiation from the source of pump radiation having a second state of polarization to the gain medium along a second axis. The first and second axes overlap in the gain medium. In some examples, the source of pump radiation is a laser diode, an array of laser diodes, or a laser diode bar. In other examples, the gain medium is situated to substantially absorb the pump radiation at the pump wavelength in the second state of polarization and emit laser radiation in substantially the first state of polarization. In a representative example, the gain medium is Yb:KGW. In some examples, the polarizer includes a dielectric coating configured to substantially transmit laser radiation and reflect pump radiation and is situated so that laser radiation is incident substantially at a Brewster angle. The laser radiation and the pump radiation are substantially P-polarized and S-polarized, respectfully, with respect to the polarizer.

Methods of pumping a gain medium include providing pump radiation to the gain medium in a first polarization, and producing laser radiation or amplified radiation in a second polarization in response to the pump radiation. In an example, the pump radiation is directed to the gain medium and laser radiation is directed to a laser cavity by a polarizer, and the pump radiation is provided by at least one laser diode. In representative examples, the pump radiation is substantially reflected and the laser radiation is substantially transmitted by the polarizer.

Optical amplifiers comprise a gain medium having an associated laser wavelength and pump wavelength, and a source of pump radiation that emits radiation substantially at the pump wavelength. A polarizer is configured to couple amplified radiation at a laser wavelength from the gain medium along a first axis and the pump radiation from the source of pump radiation having a second state of polarization to the gain medium along a second axis, wherein the first and second axes overlap in the gain medium. In representative examples, the gain medium has first and second absorption cross sections for pump radiation having the first and the second polarization states, respectively, wherein the second absorption cross section is greater than the first absorption cross section. In some examples, the polarizer is configured to couple the pump radiation to the gain medium by reflection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The foregoing and other features and advantages of the disclosed technology will become more apparent from the following Detailed Description, which proceeds with reference to the accompanying drawings.

BRIEF DESCRIPTION OF THE DRAWINGS

FIG. 1A is a diagrammatic representation of one embodiment of a laser employing a coupled-polarization scheme.

FIG. 1B is a diagrammatic representation of one embodiment of a gain medium and surrounding elements.

FIG. 2 is a diagram of one embodiment of a dielectric polarizer.

FIGS. 8-9 are schematic diagrams illustrating polarization-based diode laser pumping of a laser gain medium.

DETAILED DESCRIPTION

Figure 1C:
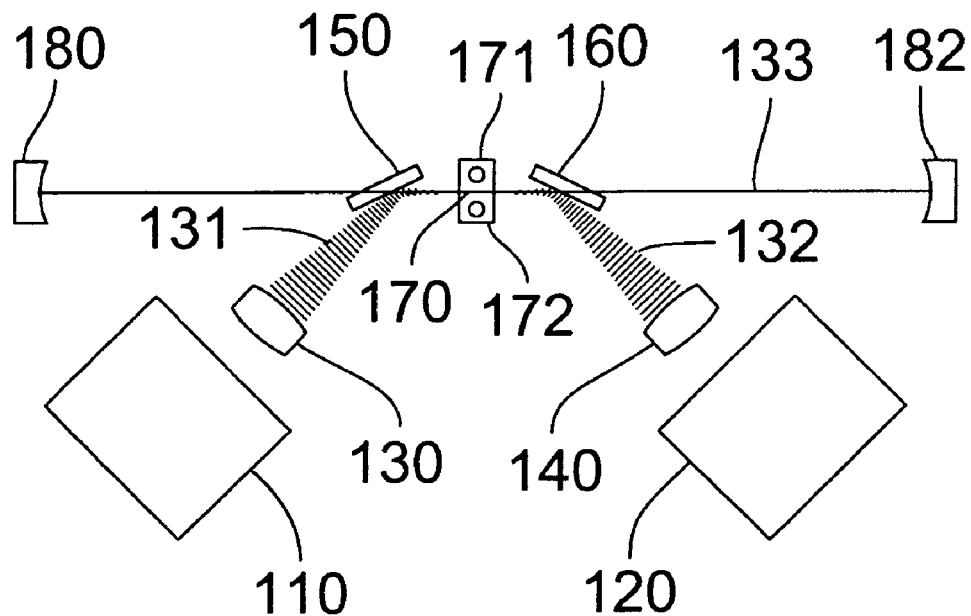
FIG. 1C is a diagrammatic representation of one embodiment of a laser cavity pumping scheme using the laser system shown in FIG. 1A.

As used in this application and in the claims, the singular forms "a," "an," and "the" include the plural forms unless the context clearly dictates otherwise. Additionally, the term "includes" means "comprises." Further, the term "coupled" means electrically, electromagnetically, or optically coupled or linked and does not exclude the presence of intermediate elements between the coupled items.

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience, representative examples are described with respect to a particular laser host, but different laser hosts can also be used without departing from the scope of the disclosure. In addition, some example laser systems are mode locked laser systems, but other examples include continuous wave (CW), Q-switched, cavity-dumped, or other laser configurations. For convenience, both pump and laser (or amplified) radiation are referred to as being at particular wavelengths, and a gain medium is referred to as having pump and gain wavelengths. Generally, these wavelengths are associated with a range of wavelengths in which pump radiation can be absorbed and in which laser radiation can be produced. As used herein, pump and laser wavelengths refer to such wavelength ranges as well as to particular selected wavelengths.

Yb Lasers

Yb-doped gain media can be used in solid state laser systems producing short pulses. Such uses are possible, in part, due to the large spectral linewidth of Yb in crystalline hosts compared to other lasing species such as Nd. Since Yb is a quasi-three level system, higher intensity pumping can be required than for Nd lasers, but thermal effects in Yb lasers are reduced as a consequence of a smaller quantum defect. A number of crystalline hosts for Yb are known. Tungstate hosts have large optical cross-sections, which is a desirable property for efficient diode pumping. Output powers in mode locked operation using a single-element gain medium are typically no greater than about 1 W using a pair of single emission region laser diodes that each produce a few watts of pump light. Higher powers in both continuous and ML operation have been reported using thin-disk and fiber technologies, but these systems are generally more complex than low-power, directly pumped diode sources. The technology described below can produce lasers with powers comparable to those of a ML Ti:Sapphire laser.

Relatively high pump powers are available from laser diode bars, and one challenge can be to effectively couple the emitters (e.g., 19 or more on a single 1 cm bar) into a single, focusable spot. In such cases thermal management can become important. This can be true even for the gain medium Yb:KGW, which has a high quantum yield for fluorescence and a low quantum defect of about 6% between the 981 nm pumping and 1040 nm lasing wavelengths. The optical anisotropy inherent in the low-symmetry monoclinic tungstate crystal can allow an efficient pump scheme using polarizers to couple the relatively divergent pumping light into a cavity, thereby providing a compact, inexpensive, and practical laser design.

One additional advantage of the Yb laser is that, since Yb operates at a relatively narrow frequency range, it is relatively easy to change the pulse width by changing the laser cavity dispersion. Examples of this are described below in more detail.

Representative Yb Mode-Locked Laser Systems

FIG. 1A shows a diagrammatic representation (not necessarily to scale) of a cavity and a pump arrangement for a laser system 100. The system 100 comprises one or more pump sources, such as shaped diode bar assemblies 110, 120. Light from the assemblies 110, 120 can be focused by lenses 130, 140, respectively, and by collimating optics (not shown) onto gain medium 170. Gain medium 170 is situated between dielectric polarizers (DPs) 150, 160, and can be selected for its polarizing properties. For example, the gain medium 170 can be selected such that pump light is absorbed by the gain medium 170 in a first polarization state and laser light is emitted in a second polarization state. Absorption cross section can be functions of a state of polarization such as linear, elliptical, or circular polarizations. In Yb, pump light and laser emission can be arranged to be in substantially orthogonal linear polarizations. In other examples, non-polarizing gain media may also be used in which absorption and emission states of polarization are generally not functions of the gain media but of the optical system used to define a resonant cavity. The state of polarization for laser radiation in isotropic and anisotropic gain media can be selected based on differences in cavity losses for different polarization states. The gain medium 170 can be adjacent to a cooling system such as cooling plates 171, 172 to control gain medium temperature, thermal focusing, and temperature (or stress) induced birefringence.

In some embodiments, the collimating optics can be integrated with diode bar assemblies 110, 120, or they can be provided in separate packages. The collimating optics reshape the pump beams from the laser diodes for delivery to the gain medium. Typically, the diode laser pump beams are combined and configured to overlap a selected laser emission spatial mode. Single diodes can be used in place of diode bar assemblies 110, 120, but such single emitters generally cannot provide as much power as laser diode bar assemblies. For example, a single-emitter diode may generate about 6 W of pump power, while a bar assembly can generate powers of 20-30 W or more. In a typical example, the output beam from the diode assemblies 110, 120 is vertically polarized, and the diode assemblies 110, 120 are water-cooled. Preferably, the diode assemblies 110, 120 are small enough to couple directly or almost directly to the gain medium 170 and additional relay optics are unnecessary.

The laser system 100 further comprises reflectors 180, 182 (also known as "fold mirrors") and an output coupler (OC) 186. Reflectors 180, 182 have radii of curvature of about 500 mm and have negative dispersion coatings. To control negative dispersion, the laser system 100 can also comprise a saturable absorber mirror (SAM) 190 configured to receive light that has passed through a multiple-bounce Gires Toumois Interferometer (GTI) 192. Negative dispersion can also be controlled by reflectors 180, 182. Light can be directed from the GTI 192 to the SAM 190 by a fold mirror 194. Fold mirror 194 has a radius of curvature of about 800 mm. The SAM 190 and the fold mirror 194 are separated by a distance d, which can be adjusted to improve laser power and stability. Selection of particular combinations of the OC 186 and the SAM 190 can allow for solution mode locking. The cavity of FIG. 1A can provide independent control of laser beam spot sizes in the gain medium 170 and in the SAM 190 for stable ML operation. Preferably, the fold angles in the cavity are small (e.g., less than about 3 degrees) so that cavity astigmatism is small. Lasing wavelength can be tuned by changing cavity dispersion.

Dielectric Polarizers

Some Yb:KGW and Yb:KYW laser media exhibit large optical absorption and emission cross-sections for radiation that is polarized parallel to a crystal a-axis. A crystal b-axis has a smaller absorption cross-section than the a-axis, but the emission cross section of the b-axis is nearly as large as the a-axis maximum. Transmission losses for laser radiation polarized along the b-axis are also generally smaller than those polarized along the a-axis. These properties can be used in selection and arrangement of a dielectric polarizers (such as dielectric polarizers 150, 160), as shown in more detail in FIG. 2.

As seen in FIG. 2 (which is not necessarily to scale), dielectric polarizer 200 is comprises a substrate 210. The polarizer 200 is configured to be tilted at an angle of incidence $\theta$ with respect to a lasing beam 205 emitted from the gain medium 170 (not shown in FIG. 2). A coating 220 is applied to a first surface 212 of substrate 210 that receives the laser beam (and is situated so as to face a gain medium such as the gain medium 170 of FIG. 1A). The coating 220 is configured have a reflectance and transmittance that are functions of state of polarization so that dielectric polarizer 220 is a polarization-sensitive dichroic mirror.

The coating 220 is typically selected to provide a high reflectivity for S-polarized radiation incident at the angle $\theta$, and it is generally configured based on the angle of incidence $\theta$ and a refractive index of the substrate 210. The coating 220 typically includes a plurality of dielectric layers, wherein the dielectric layers have refractive indices of between about 1.40 and 2.30. The substrate 210 can be made of, for example, optical glasses such as BK-7 or other glasses, fused silica, or other optical materials that are substantially transparent to radiation at either the pump wavelength or the laser wavelength (or both). Composition (i.e., number, thickness, and refractive index) of the layers of the coating 220 can be adjusted based on the refractive index of the substrate 210.

An additional coating 230 can be applied to substrate 210 on a second surface 214 that is typically situated so as to face away from gain medium 170. The coating 230 is generally configured as an antireflection coating for the laser radiation. In some examples, the dielectric polarizer 200 is situated so that the laser beam is incident at an angle $\theta$ that corresponds to a Brewster angle so that a P-polarized laser beam is transmitted by the dielectric polarizer 200 without substantial reflection. In either case, the polarizer 200 generally reflects light of a first polarization and wavelength while generally transmitting light of a second polarization and wavelength. For example, in one embodiment, the polarizer 200 reflects S-polarized radiation (typically, pump radiation) with a wavelength of about 981 nm and transmits P-polarized laser radiation (typically, laser radiation) with a wavelength of about 1040 nm. Alternatively, the dielectric coating 220 can be configured to substantially transmit pump radiation, and to substantially reflect laser radiation. In this embodiment, the polarizations of the pump and laser radiation are still substantially perpendicular to each other.

Example Implementation

In one implementation of laser system 100, the diode bar assemblies 110, 120 are not identical, but provide 15 W and 20 W, respectively, in a far-field single spot at a drive current of 35 A. One such diode assembly is a Model S14-981-1 diode assembly, available from Apollo Instruments, Inc., Irvine, Calif. In this particular diode assembly, 20 laser diodes are placed horizontally, end-to-end, but an assembly with vertically stacked diodes can also be used. Collimating optics can focus magnified images of individual emitters (the magnified images can be, for example, about 0.5 by 10 mm) into an output beam of about 10 mm by 10 mm, with a nominal beam divergence of 3 mrad in each direction. The lenses 130, 140 are achromatic and have a focal length of 75 mm.

FIG. 1B shows the gain medium 170 and some possible surrounding features in more detail. The gain medium 170 is an Yb:KGW crystal that can be, for example, a 10 mm square slab situated for near-normal-incidence longitudinal pumping. Anti-reflection coatings 174, 175 can be provided. The crystal is approximately 1.4 mm thick and has an Yb doping of 1.5%. Such a crystal can be obtained from NovaPhase, Inc., Newton, N.J. Other crystals can be used. The 10 mm square faces of the gain medium 170 are adjacent to water-cooled plates 171, 172 that are thermally coupled to the gain medium 170 with indium foil layers 176, 178. Light entering the gain medium 170 therefore propagates along an axis 179 through the crystal. As shown in the example of FIG. 1A, the Yb:KGW crystal is situated so that a crystal a-axis is vertical, and a crystal b-axis is horizontal.

Referring further to FIGS. 1A-1B, both the pump and laser beams propagate along the axis 179, thus providing a relatively long absorption/gain path in the gain medium 170. This long path and the relatively low Yb doping can reduce temperature rises at edges of the Yb:KGW crystal, but such a long path is typically associated with matching a divergence of the diode pump beam over the long laser/pump beam overlap region. For this particular Yb:KGW crystal, measured average pump beam absorption is about 93% (more than 98% at the absorption center wavelength).

Figure 1D:
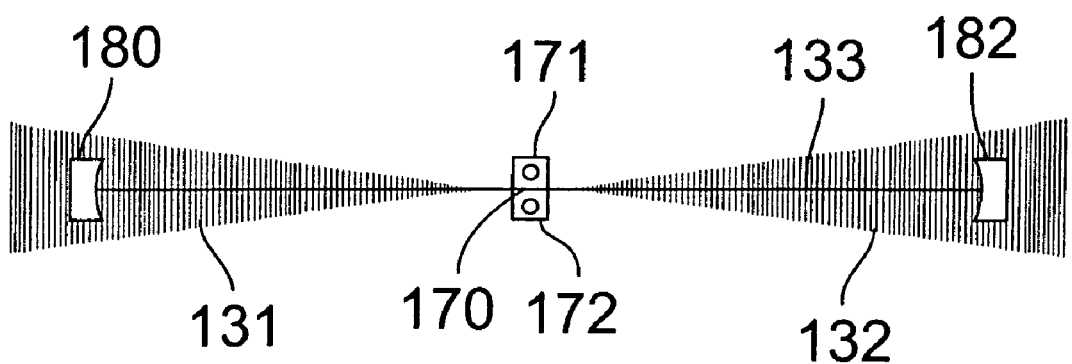
FIG. 1D is a diagrammatic representation of a prior art laser cavity pumping scheme.

FIGS. 1C-1D compare some possible configurations for laser cavities pumped with convergent diode beams. Gray areas in these figures represent paths of diode pump beams. FIG. 1C depicts a laser cavity similar to that of laser system 100 of FIG. 1A, where pumping beams 131, 132 enter the cavity at an angle relative to lasing beam 133. FIG. 1D shows a more traditional laser cavity configuration where pump beams 131, 132 enter the cavity approximately parallel to lasing beam 133, perhaps through mirrors 180, 182.

Returning to FIG. 1A, the laser system 100 can be configured to couple a pumping beam with a large numerical aperture into the gain medium 170. In one embodiment, the laser beam has a diameter of about 6-8 cm at reflectors 180, 182. As mentioned above, in other examples the diode bar assemblies 110, 120 can be situated so as to direct pump radiation through the reflectors 180, 182 to the gain medium 170. System 100 can be configured to be relatively compact due at least in part to polarizers 150, 160. These polarizers preferably have little effect on the properties of the laser cavity as a whole.

In a particular example, a first set of dielectric polarizers 150, 160, comprising a first type of coating, has greater than 98% reflectivity for P-polarized radiation at the pump wavelength and 99.8% transmission for S-polarized radiation at the laser wavelength when situated at about a Brewster angle. To avoid optical damage, the dielectric polarizers 150, 160 can be situated several centimeters from the gain medium 170, or otherwise displaced from the gain medium 170. Also, the output coupler 186 can be changed to have a lower or higher reflectivity. In another example, a second set of dielectric polarizers, comprising a second type of coating, had 89% reflectivity and 99.3% transmission at pump and laser wavelengths, respectively. However, this second coating was more resistant to optical damage, and was capable of operating for hundreds of hours without any additional displacements from the gain medium 170.

Some cavity distances for this particular embodiment are shown in Table 1. Those of skill in the art will recognize that other distances can be used, and other cavity configurations are possible. The dielectric polarizers 150, 160 are placed close enough to the gain medium 170 to allow a focal spot that is of sufficient size for effective pumping of the quasi-three-level Yb:KGW laser. Some example spot sizes are described below.

TABLE 1

Representative Laser Cavity Dimensions

| Cavity Distance | Length (mm) |
| --- | --- |
| d | 577 |
| Long arm (reflector 182 to fold mirror 194, including mirror bounces in GTI 192) | 1870 |
| Reflector 180 to OC 186 | 750 |
| Reflector 180 to gain medium 170 | 355 |
| Reflector 182 to gain medium 170 | 370 |

Obtaining a high quality, diffraction-limited laser beam can require careful alignment of the pump laser diodes, and is achievable with a lasing radius between 100 and 180 μm at the gain medium 170. Radiation in the long arm in this embodiment is well collimated, and is suitable for insertion of a GTI mirror pair. The OC 186 has 85% reflectivity. Continuous wave (CW) output power (measured with a high reflectivity mirror in place of the SAM) is 7.6 W, and depends on the distance from the fold mirror 194. The round-trip cavity loss from the dielectric polarizers 150, 160 is about 2.8%, with about 1% additional loss from the antireflection coatings on the gain medium 170 and from mirror losses. While this cavity has greater losses than some other Yb diode-pumped laser configurations, the gain and output power levels are also greater. Operation with a high-transmission output coupler has the advantage that a SAM with substantial loss can be used effectively to enforce stable single-pulse mode-locked operation while minimizing heating in the SAM.

Figure 3:
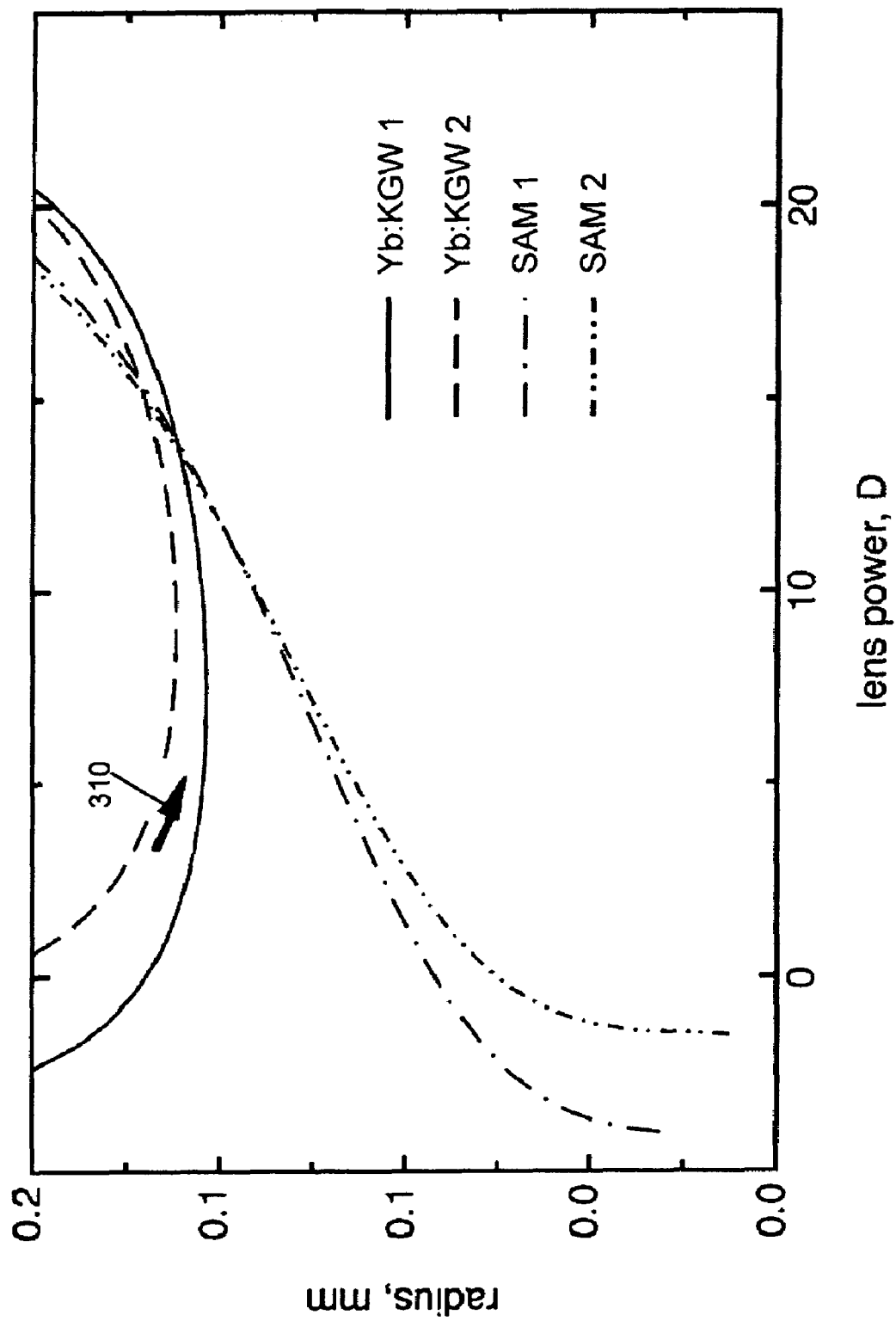
FIG. 3 is a representative plot of spot sizes, as a function of lensing, in a Yb:KGW crystal and in a saturable absorber mirror (SAM).

With diode-pumped solid state lasers, cavity alignment and stability can depend on thermal lensing. Thermal lens effects in a strongly pumped Yb:KGW crystal can be as large as 10 diopters ("diopters" or $m^{-1}$, abbreviated "D") with 7 W of absorbed pump light. FIG. 3 shows plots of one set of measurements for laser beam spot radii in a Yb:KGW crystal gain medium and a SAM as a function of thermal lensing in Diopters. Continuous wave (CW) lasing occurs at a thermal lensing of 3D, and ML operation occurs with larger thermal lensing. All spot sizes are calculated using the inferred 3D lens. The thermal lensing under lasing conditions was determined by systematically exploring the stability limits of a symmetric 4-mirror cavity.

The plots of FIG. 3 were obtained using two different values for d. Measurements represented by Yb:KGW 1 and SAM 1 were obtained with d=577 mm, a distance selected to provide long pulses. Measurements represented by Yb:KGW 2 and SAM 2 were obtained with d=572 mm, a distance selected to provide stable, short pulses. As the system 100 transitions from continuous to ML operation, the operating point of the system 100 moves in the direction of arrow 310 (i.e., the laser is forced to operate with additional lens power provided by the combination of nonlinear effects in the gain medium and the thermal lensing due to the diode pump light).

Stable ML operation can be produced in the example implementation as follows. The diode focus and overlap is optimized with CW lasing using a beam radius in the gain medium 170 of about 100 μm, and an 85% reflectivity OC

186. CW power is about 9 W and is nearly constant for spot sizes from less than about 100 μm radius to about 125 μm radius. The mirror cavity is adjusted to produce a spot size of 156 μm, with a decrease in spot size due to the additional lensing induced by nonlinear effects (indicated by arrow 310 in FIG. 3). The SAM 190 (available from BATOP Optoelectronics GmbH) has a reflectivity of 0.7-1.7%. A SAM with higher absorbance can allow for self-starting mode locking over a wider range of cavity configurations than a SAM with a lower absorbance. For a SAM with a lower absorbance, a light tap can be required to initiate mode locking. In practice, it is convenient to place the SAM 190 on a translation stage (not shown in FIG. 1A) to easily adjust d and to locate a stable operating point. Operation with shorter pulses requires decreasing the distance d, resulting in the second operating point indicated in FIG. 3 (represented by plot lines for Yb:KGW 2 and SAM 2). Under ideal conditions, lens powers higher than those shown in FIG. 3 can result.

In this particular embodiment, the reflectors 180,182 have a combined dispersion of −1300 fs$^2$, enough to offset the positive material dispersion of the gain medium 170. Additional dispersion is provided by a flat mirror pair in GTI 192, with each reflection providing about −1000 fs$^2$. The 12.7 mm diameter mirrors can accommodate between 1 and 4 spots per mirror.

Figure 4A:
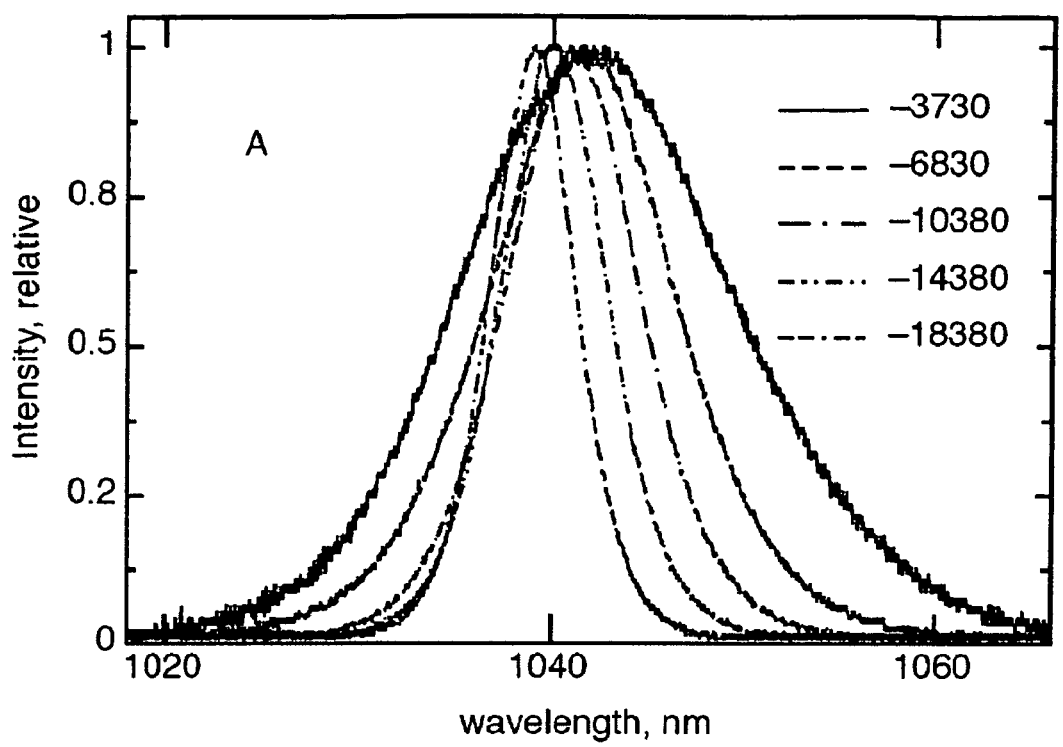
FIGS. 4A and 4B are spectra and autocorrelation traces, respectively, for cavity dispersions listed in Table 1.
Figure 4B:
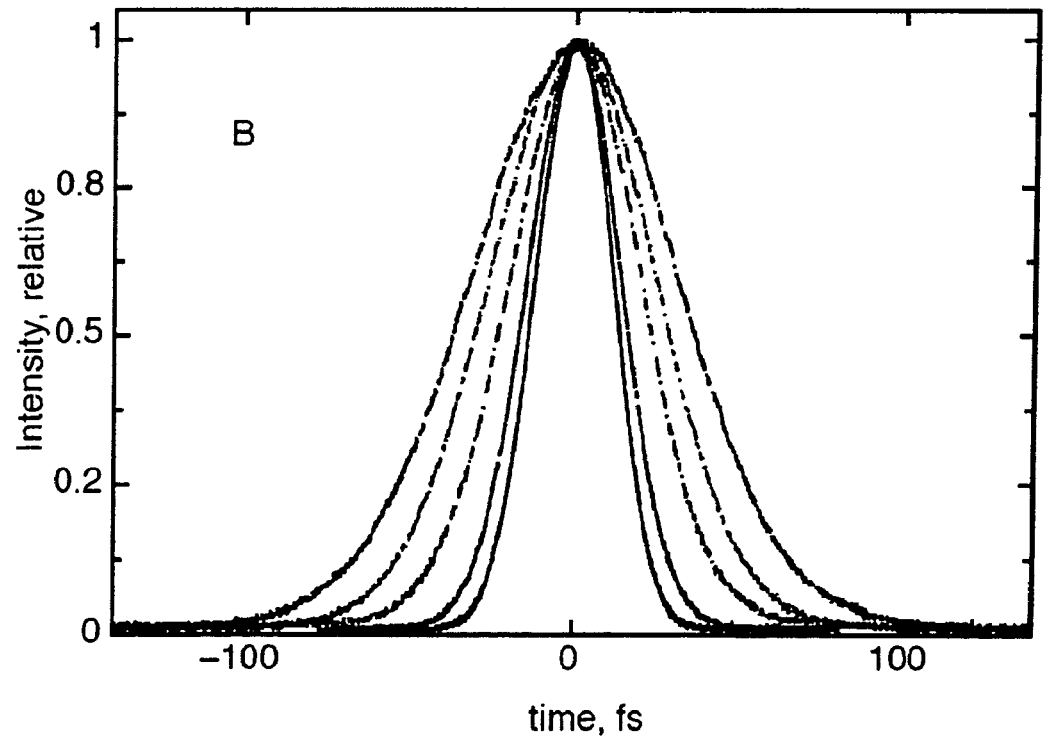

Table 2 shows sets of measurements taken from the example implementation of system 100 described above. In this table, D is the estimated net round-trip cavity dispersion, SW is the spectral half-width, T is the measured pulse width (assuming a sech$^2$ deconvolution factor), and P is the output power. As seen in Table 2, the spectral pulse width and measured pulse width vary linearly with total negative dispersion, as expected from solution-mode theory. The spectra and autocorrelation shapes are plotted in FIGS. 4A and 4B, respectively, for each set of measurements in Table 2. The plots are relatively smooth, and the pulses have a stable amplitude as observed with a fast diode and oscilloscope. The shortest pulses are about 1.4 times the transform-limited width, assuming a hyperbolic-secant pulse shape, but the longer pulses are transform limited to within the measurement accuracy. A 1.5% absorbance SAM was used for the results presented in FIGS. 4A and 4B, and in Table 2.

TABLE 2

Measurements taken from an example implementation.

| D (fs$^2$) | SW (nm) | T (fs) | P (W) |
|---|---|---|---|
| −3730 | 16.4 | 90 | 3.7 |
| −6380 | 11.2 | 108 | 4.3 |
| −10380 | 8.3 | 150 | 5.1 |
| −14380 | 6.5 | 193 | 5.5 |
| −18380 | 5.2 | 236 | 5.9 |

As seen from the results in Table 2, laser system 100 can provide approximately 6 W at 1040 nm with 236 fs pulse width. With changes in cavity dispersion, the pulse width can be adjusted to less than 100 fs.

In another example, a net group delay dispersion of about −18200 fS$^2$ produced a measured pulse width of about 350 fs FWHM, or a width of 225 fs assuming a hyperbolic-secant pulse shape. The output power was about 6.3 W.

The role of nonlinear refractive index (Kerr lens mode locking, or KLM) in the stabilization of ML pulse formation is well known. The role of the SAM 190 in this laser can be in initiating a high-power pulse. When the SAM 190 is replaced by a high reflectivity mirror, intense modulation is seen during mirror translation or tapping a mirror, and in some cases, bursts of ML pulses are observed. The spectral and autocorrelation profiles of this laser, at the pulse widths shown in Table 2, are similar to those of reported "pure" KLM lasers. KGW crystals in general have a high refractive index (about 2.0 for radiation polarized parallel to the b-axis), and a large $n_2$ has been recently reported.

In the example implementation, no damage of the SAM 190 is seen as long as the laser spot size is larger than about 100 μm with the 85% reflectivity OC 186.

Higher reflectivity output couplers and larger mode diameters in the Yb:KGW crystal generally result in optical damage to the SAM unless the laser spot size at the SAM 190 is increased. In one case, at a repetition rate of 36 MHz and a power of 5.9 W, pulse energy was 164 nJ with a pulse width of 236 fs. With higher-power diode collimation packages and improved polarizers, laser efficiency and output power can be increased.

Example Applications

The output of laser system 100 can be suitable for pumping a number of optical systems. Demonstrated laser powers for the laser system 100 are competitive with conventional Ti:Sapphire ultrafast lasers. In addition, the Yb:KGW lasers described herein are relatively simple and inexpensive since a high-quality, visible pump laser is not required. By scaling laser spot sizes, inexpensive, single-emitter diode pump lasers can provide output powers of several watts, so that such Yb:KGW lasers are well suited for optical systems for multiphoton microscopy and nonlinear spectroscopy.

Figure 5:
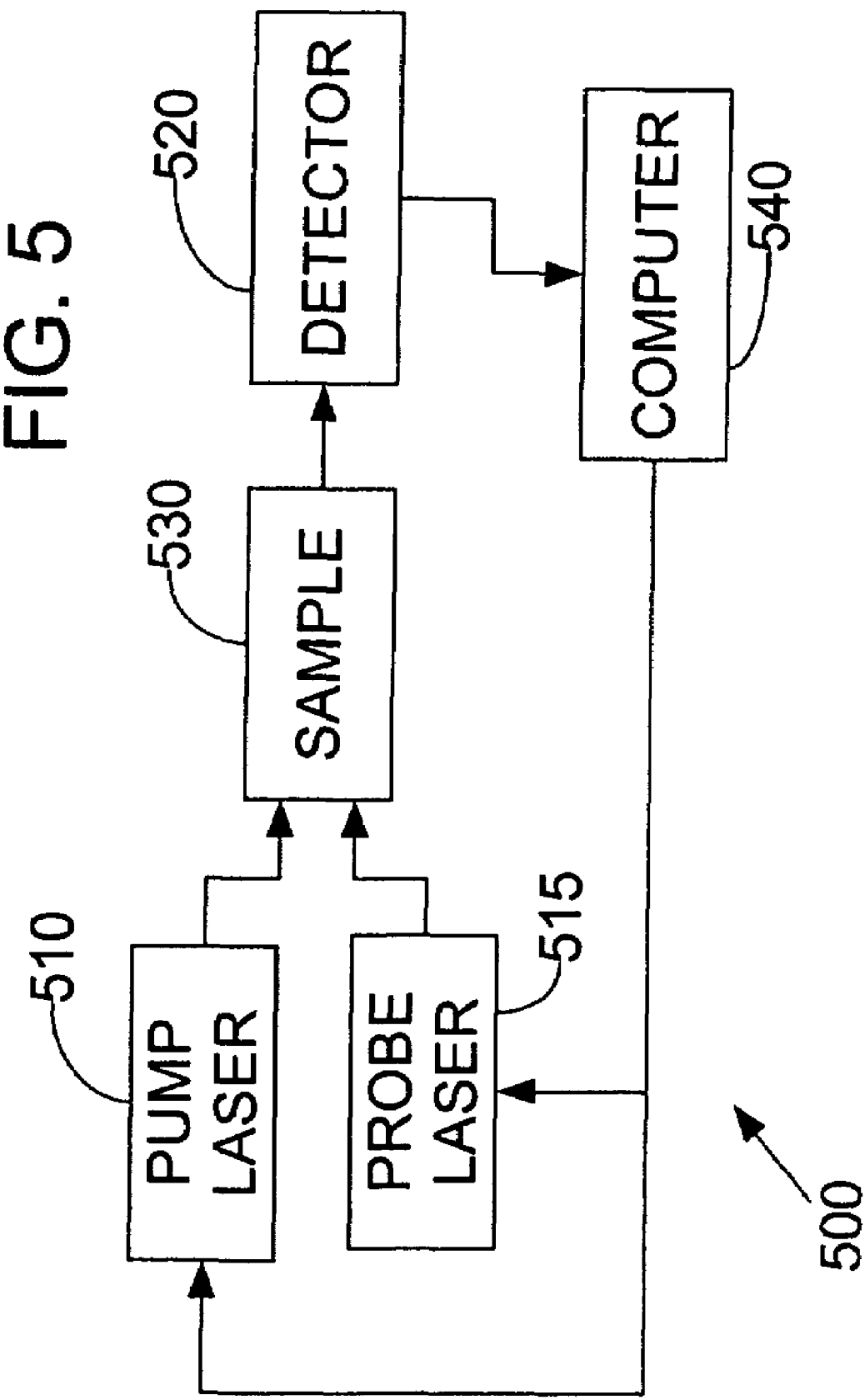
FIG. 5 is a block diagram of one example of a detection system.

FIG. 5 is a block diagram of an nonlinear spectroscopy system 500. The system 500 comprises a pump laser 510 and a probe laser 515 that can be similar to the laser system 100 of FIG. 1A. The pump laser 510 and the probe laser 515 are configured to direct respective beams to a sample 530. The detector 520 can be configured to communicate results or to receive configuration data from a computer 540 that can be configured to process measurements and control the pump laser 510 and the probe laser 515.

Figure 6:
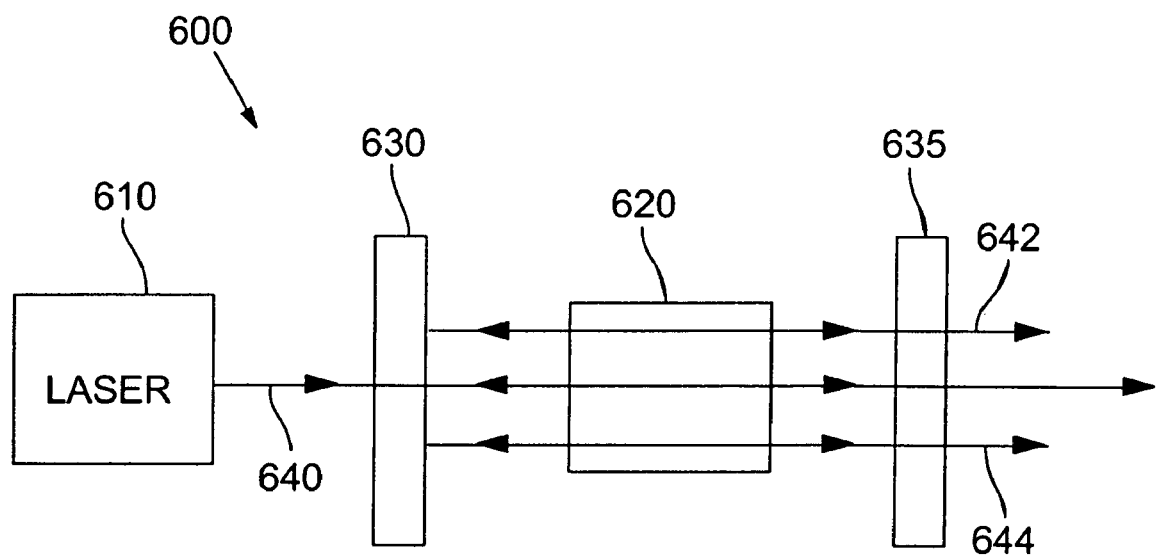
FIG. 6 is a block diagram of an example optical parametric oscillator (OPO) system.

The laser of system 100 can also be used in conjunction with other elements to modify an emitted laser beam for various applications. For example, FIG. 6 is a block diagram of an example optical parametric oscillator (OPO) system 600. The system comprises a laser 610, similar to the laser system 100 of FIG. 1A, a non-linear optical medium 620, and dielectric mirrors 630, 635. Laser 610 generates a pump beam 640 which enters the optical cavity formed by the optical medium 620 and the mirrors 630, 635. Optical medium 620 can be selected from the many media known in the art, and typically is a crystalline non-linear material. The pump beam 640 interacts with the optical medium 620 so as to produce a nonlinear polarization that can radiate to produce additional beams 642, 644 that are emitted from the mirror 635. The wavelengths of the beams 642, 644 can be selected using techniques such as, for example, selection of suitable phase matching conditions in the non-linear optical medium 620. Phase matching can be provided based on an orientation or temperature of the medium 620.

The example laser system 100 of FIG. 1A can also be used to pump other types of OPO systems as are known in the art. Coherent beams 642, 644 may be used in multiphoton microscopy or spectroscopy systems, or in other appropriate applications. One laser 610 may be used to pump multiple OPO systems, and the systems can produce beams with different wavelengths.

Figure 7:
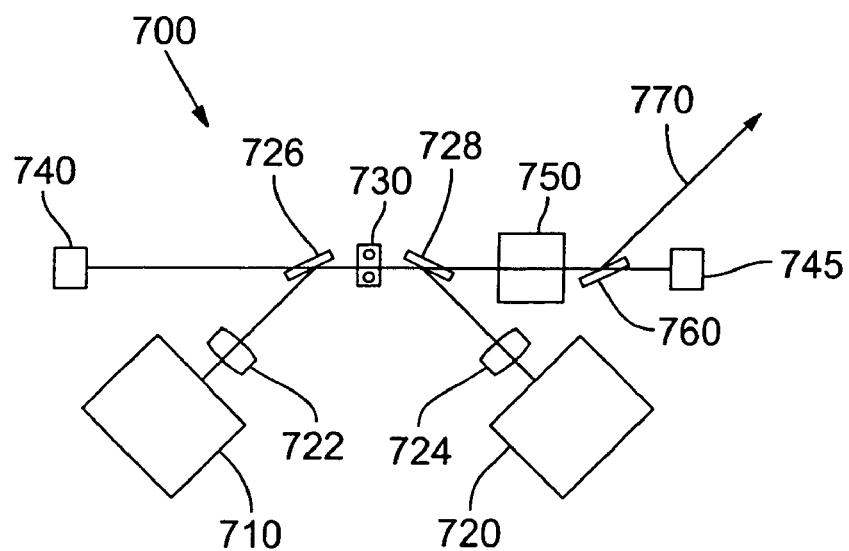
FIG. 7 is a block diagram of an example regenerative amplifier system.

Laser system 100 can also be used in an oscillator or amplifier. FIG. 7 shows a block diagram of an example regenerative amplifier system 700. The system 700 comprises diode bar assemblies 710, 720, lenses 722, 724, dielectric polarizers 726, 728, and mirrors 740, 745. Some or all of these elements can be similar to those described above with respect to system 100 of FIG. 1A. System 700 further comprises a gain medium 730 with surrounding elements. This can be a longitudinally pumped Yb:KGW crystal, similar to the medium described above with respect to FIGS. 1A and 1B. Other gain media known in the art can also be used. System 700 further comprises a Pockels cell or other modulator 750. An additional mirror 760 transmits an amplified beam 770, possibly to additional components (not shown) as are known in the art, such as a pulse stretcher or pulse compressor, for example. In an additional application, laser system 100 can be used for pumping other amplifiers such as a fiber amplifier that includes an Yb-doped fiber. In other applications, laser system 100 can be used for materials processing with focused beams.

In the examples above, pump radiation is supplied to a gain media using a dielectric polarizer configured for placement at or near the Brewster angle for the laser beam. In other examples, polarizing beam splitters that include a dielectric coating can be used, or crystalline polarizers such Wollaston polarizers, beam splitting Glan-Thompson prisms, or other prism or beam splitter configurations can be used. Such crystalline polarizers are typically made of crystal quartz, calcite, or other birefringent materials. These crystalline materials can be uniaxial or biaxial, and orthogonal states of polarization can be combined or separated as needed for diode pumping based on differences in a critical angle or angles of refraction due to the different refractive indices for pump and laser wavelengths. Some examples are illustrated in FIGS. 8-9.

Referring to FIG. 8, a gain medium 802 is situated so as to define an axis 800. Pump radiation at a pump wavelength $\lambda_{pump}$ is coupled from pump sources (not shown) to the gain medium 802 by reflection from a dielectric layer 805 of a first polarizing beam splitter 804 and transmission through a dielectric layer 807 of a second polarizing beam splitter 806. In the configuration of FIG. 8, laser radiation is polarized so as to be substantially transmitted by the polarizing beam splitter 804 and substantially reflected by the polarizing beam splitter 806. The axis 800 is extended in FIG. 8 to include axis portions defined by reflections by the beam splitters. The gain medium 802 can be optically anisotropic and can be situated so that pump and laser radiation polarization states are associated with different preferred emission/absorption cross sections of the gain medium 802. The polarizing beam splitters 804, 806 can be dielectric polarizing beam splitter cubes, or can be based on crystalline materials.

FIG. 9 is a schematic diagram illustrating pumping of a gain medium 902. Pump and laser radiation (or amplified radiation) are coupled to or from the gain medium 902 along respective axes 900A, 900B and propagate along an axis 900 in the gain medium 902. The axes 900A, 900B are defined by a crystalline beam combiner 904 that is based on differences in refractive index for different states of polarization.

In view of the many possible embodiments to which the principles of the disclosed technology may be applied, it should be recognized that the illustrated embodiments are only representative examples and should not be taken as limiting. For example, polarization based pumping can be used with gain media having absorption or emission cross sections that are function of polarization, or with gain media in which these cross sections are independent of polarization. In addition, laser diodes are convenient pump sources, but in other examples, pump radiation can be obtained from other pump sources. Example gain media include solid state gain media, but other optically pumped gain media can be similarly configured. Thus, the scope of the invention is not limited by the illustrated examples but is defined by the following claims. I therefore claim as my invention all that comes within the scope and spirit of these claims.

I claim:

1. A laser, comprising:
   a gain medium having an associated laser wavelength and pump wavelength;
   a source of pump radiation that emits radiation substantially at the pump wavelength; and
   a polarizer configured to couple laser radiation at the laser wavelength and having a first state of polarization from the gain medium along a first axis and the pump radiation from the source of pump radiation having a second state of polarization to the gain medium along a second axis, wherein the first axis and second axis are parallel in the gain medium, wherein the gain medium has first and second absorption cross sections for pump radiation having the first and the second polarization states, respectively, and wherein the second absorption cross section is greater than the first absorption cross section.

2. The laser of claim 1, wherein the source of pump radiation is a laser diode.

3. The laser of claim 1, wherein the source of pump radiation is an array of laser diodes.

4. The laser of claim 1, wherein the source of pump radiation is a laser diode bar.

5. The laser of claim 1, wherein the gain medium is situated to substantially absorb the pump radiation at the pump wavelength in the second state of polarization.

6. The laser of claim 1, wherein the gain medium is Yb-doped.

7. The laser of claim 6, wherein the gain medium is Yb:KGW.

8. The laser of claim 1, wherein the polarizer is configured to substantially transmit laser radiation and reflect pump radiation.

9. The laser of claim 1, wherein the polarizer includes a dielectric coating situated on a polarizer substrate.

10. The laser of claim 9, wherein the polarizer substrate is situated so that laser radiation is incident substantially at a Brewster angle, wherein the first state of polarization is substantially a P-polarization with respect to the substrate.

11. The laser of claim 10, wherein the polarizer substrate is situated so that the pump radiation is substantially S-polarized with respect to the substrate.

12. The laser of claim 9, wherein the polarizer substrate is situated so that the pump radiation is substantially S-polarized with respect to the substrate.

13. The laser of claim 1, further comprising a cooling plate contacted to the gain medium with a conductive layer.

14. The laser of claim 13, wherein the cooling plate is configured to permit a flow of a coolant and the conductive layer is a conformable metallic layer.

15. The laser of claim 1, wherein a laser wavelength is about 1040 nm and a pump wavelength is about 981 nm.

16. The laser of claim 1, further comprising a saturable absorber mirror configured to provide a selected a negative dispersion.

17. An optical amplifier, comprising:
   a gain medium having an associated laser wavelength and pump wavelength;
   a source of pump radiation that emits radiation substantially at the pump wavelength; and a polarizer configured to couple amplified radiation at the laser wavelength and having a first state of polarization from the gain medium along a first axis and the pump radiation from the source of pump radiation having a second state of polarization to the gain medium along a second axis, wherein the gain medium has first and second absorption cross sections for pump radiation having the first and the second polarization states, respectively, wherein the second absorption cross section is greater than the first absorption cross section.

18. The optical amplifier of claim 17, wherein the polarizer is configured to couple the pump radiation to the gain medium by reflection.

* * * * *

UNITED STATES PATENT AND TRADEMARK OFFICE
CERTIFICATE OF CORRECTION

| | |
|---|---|
| PATENT NO. | : 7,457,328 B2 |
| APPLICATION NO. | : 11/436731 |
| DATED | : November 25, 2008 |
| INVENTOR(S) | : Holtom |

Page 1 of 1

It is certified that error appears in the above-identified patent and that said Letters Patent is hereby corrected as shown below:

<u>Title page, item [56] in the References Cited – Other Publications:</u>
Column 1, page 1, "diodeo-pumped" should read --diode-pumped--

Column 5, lines 53-54, "Toumois" should read --Tournois--

Column 5, line 61, "solution" should read --soliton--

Column 6, line 11, "a dielectric polarizers" should read --dielectric polarizers--

Column 6, line 15, "is comprises" should read --comprises--

Column 6, lines 21-22, "configured have" should read --configured to have--

Column 9, line 33, "solution" should read --soliton--

Column 9, line 59, "fS2" should read --$fs^2$--

Column 10, line 32, "an nonlinear" should read --a nonlinear--

Column 11, lines 21-22, "a gain media" should read --gain media--

Column 11, line 25, "such Wollaston" should read --such as Wollaston--

Column 12, lines 61-62, "a selected a negative" should read --a selected negative--

Signed and Sealed this

Third Day of August, 2010

David J. Kappos
*Director of the United States Patent and Trademark Office*